United States Patent [19]

Hazel

[11] Patent Number: 5,036,194
[45] Date of Patent: Jul. 30, 1991

[54] LENS SYSTEM FOR OPTIC TEMPERATURE SENSOR

[75] Inventor: Barry D. Hazel, South Bend, Ind.

[73] Assignee: Allied-Signal Inc., Morristown, N.J.

[21] Appl. No.: 485,673

[22] Filed: Feb. 27, 1990

[51] Int. Cl.$^5$ .................. H01J 5/16; G01K 11/00
[52] U.S. Cl. ........................ 250/227.21; 374/161; 350/96.18; 350/96.29
[58] Field of Search ............ 374/161, 131, 162; 250/231.1, 227.21, 227.23, 458.1, 459.1; 350/96.18, 96.29, 96.31, 96.24; 356/43, 51

[56] References Cited

U.S. PATENT DOCUMENTS

| | | | |
|---|---|---|---|
| Re. 31,832 | 2/1985 | Samulski | 374/131 |
| 4,179,927 | 12/1979 | Saaski | 374/161 |
| 4,223,226 | 9/1980 | Quick et al. | 374/131 |
| 4,592,664 | 6/1986 | Bijlenga et al. | 374/131 |
| 4,626,110 | 12/1986 | Wickersheim et al. | 374/161 |
| 4,644,154 | 2/1987 | Brogardh et al. | 250/227.23 |
| 4,749,856 | 6/1988 | Walker et al. | 250/231.1 |
| 4,752,141 | 6/1988 | Sun et al. | 374/161 |
| 4,785,824 | 11/1988 | Wickersheim et al. | 374/161 |
| 4,799,756 | 1/1989 | Hirschfeld | 250/458.1 |
| 4,895,156 | 1/1990 | Schulze | 374/161 |

FOREIGN PATENT DOCUMENTS

| | | | |
|---|---|---|---|
| 0161623 | 10/1982 | Japan | 374/161 |
| 0005622 | 1/1983 | Japan | 374/161 |
| 0182520 | 10/1983 | Japan | 374/161 |

*Primary Examiner*—David C. Nelms
*Assistant Examiner*—Michael Messinger
*Attorney, Agent, or Firm*—Leo H. McCormick, Jr.; Larry J. Palguta; Robert A. Walsh

[57] ABSTRACT

An optic system (10) having a lens arrangement (38) for collimating a beam of light carried by a first array (20) of a bifurcated fiber bundle (18) to uniformly illuminate the entire surface (36) of a fluorescent material (30) to create an output signal corresponding to the temperature of the fluorescent material (30). The lens arrangement (38) focuses the output signal onto the end (34) of bifurcated fiber bundle (18) where a second array (24) communicates up to one half of the output signal generated by the glow of the fluorescent material (30) to a detector (44) which processes the output signal to inform an operator of the temperature of the fluorescent material (30).

3 Claims, 1 Drawing Sheet

LENS SYSTEM FOR OPTIC TEMPERATURE SENSOR

BACKGROUND OF THE INVENTION

This invention relates to an optic temperature sensor having a lens system for collimating a beam of light carried by a first array of bifurcated fiber bundle from a source to illuminating the entire surface of a fluorescent material to produce an output signal. The lens system focuses the output signal into a second array of the bifurcated fiber bundle to provide a detector with a signal corresponding to the temperature of the fluorescent material.

Fiber optic sensors have been used to measure temperatures in hostile environments. When a rare earth doped refractory oxide phosphor such as europium or fluorescent crystal such as chromium doped aluminum oxide is excited by a modulated light, it glows. The phenomenon of glowing or fluorescence arises when some of the energy of the photons absorbed and converted to vibrational energy while the remaining energy is emitted as photons of lower energy. An electron in the ground state is excited by the capture of an incident photon into a higher energy band. An incident photon may very quickly lose some energy through collisional nonradiative processes to occupy the lowest vibrational energy level in a higher energy band. If the quantum efficiency is relatively high very few excited electrons lose their energy through collisional processes and the electrons decay to the ground state with the simultaneous emission of a lower energy photon.

The lifetime of the excited electron varies from tens of nanoseconds to seconds. The luminescent decay time of the phosphor material is a function of the temperature of an environment. With known sensors, pulses of laser light are communicated through a fiber bundle to a remote tip located in a hostile environment. The tip contains a phosphor material, which is illuminated by the laser light. The luminescent decay time varies with the temperature of the tip. The glow or light emitted by the phosphor material travels back through the same fiber bundle to a coupler where it is diverted to a photodetector. The measurement of the decay time is an indication of the temperature of the tip.

Typically the fiber bundle is divided in the middle to establish first and second separate arrays. The first array carries the laser pulses to the phosphor material while the second array carries the light emitted by the phosphor material to the photodetector. This type fiber bundle is easy to manufacture and offers mechanical strength since the individual fibers are parallel to each other. However, it has been observed that most of the light emitted by the phosphor material occurs adjacent the first array with a proportional reduction of the light emitted by the phosphor material adjacent the second array through which an output is carried to the photodetector. In addition, a portion of the light emitted by phosphor material never enters the second array because the angle of entry is too oblique to enter the individual fibers.

In an effort to improve the communication of the output signal transmitted to the photodetector, it was decided to randomly distribute the first array and second array of fibers in the bundle. In this arrangement there is a greater possibility of having a receiver fiber near an exciter fiber and thus more of the fluorescent activity or output of the phosphor material could be communicated to the photodetector. While this arrangement does provide for a greater communication of the output signal from the phosphor material, the manufacture of such structure is more difficult. When the fibers cross over each other, internal void occurs and the outside diameter of the fiber bundle increases as compared with a bundle for the same number of fibers where the fibers are parallel to each other. In addition, during interweaving of the fibers, stress is placed on the fibers where they engage the other fibers and in some instance actual breakage in the individual fiber occurs. Once a break in a fiber occurs, the efficiency is proportionally reduced.

BRIEF DESCRIPTION OF THE INVENTION

In the present invention, it was discovered that a lens system placed adjacent the end of the fiber bundle could collimate the beam of modulated light onto the entire surface of the phosphor material. Each fiber in the first array acts as a point source of light to illuminate the phosphor material. Since the entire surface of the phosphor material is simultaneously excited by each point source of light created by the modulated light carried by the first array, the fluorescent output of the phosphor material is raised to a higher level. Correspondingly, each of the atoms or molecules in the phosphor material also acts as a point source of light to develop an output signal. The lens system focuses the output created by phosphor material onto the entire end surface of the fiber bundle. Since the second array comprises approximately one half of the fiber bundle, a corresponding level of the output signal of the phosphor material is communicated by the second array to the photodetector.

It is an object of this invention to provide an optic sensor system with means to collimate a modulated light beam into a phosphor material to improve the fluorescent output thereof and focus the fluorescent output onto a fiber carrier of transmission to a photodetector.

It is a further object of this invention to provide an optic sensor system with lens means for collimating a beam of light onto the entire surface of a phosphor material to improve the fluorescent output thereof.

It is another object of this invention to provide an optic sensor system with a lens system which collimates a beam of light carried by a first array of fibers in a bundle onto the entire surface of a phosphor material and focuses the output glow of the phosphor material back onto the fiber bundle where a second array communicates a signal corresponding to the glow to a photodetector. The signal having an intensity level equal up to one half of the level of the glow created by the phosphor material.

BRIEF DESCRIPTION OF THE DRAWINGS

These objects and the advantages offered from the use of this invention should be apparent from reading this specification and viewing the drawings wherein.

DETAILED DESCRIPTION OF THE INVENTION

Figure 1:
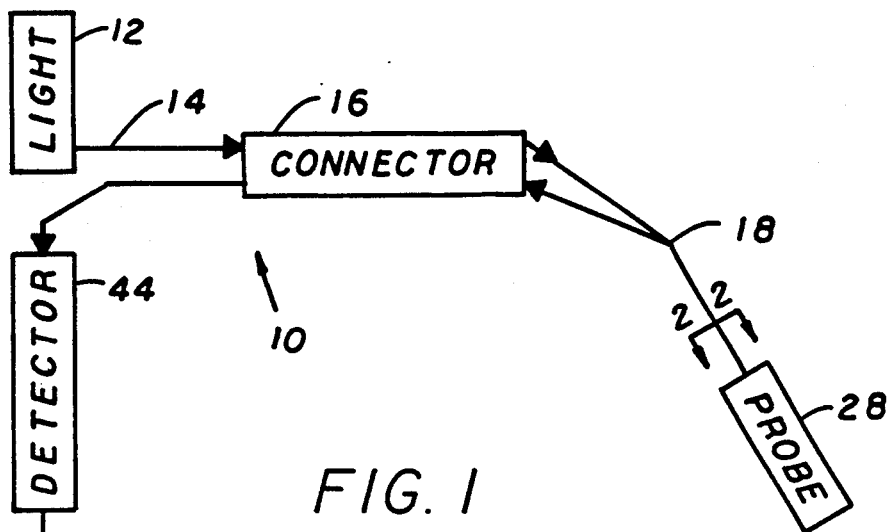
FIG. 1 is a schematic illustration of an optic sensor system embodying the present invention.
Figure 2:
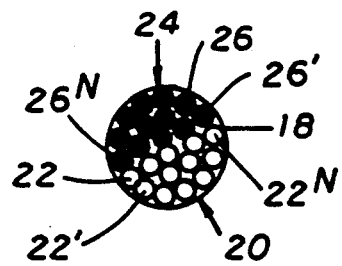
FIG. 2 is an enlarged sectional view taken along lines 2—2 of FIG. 1 illustrating a fiber optic bundle.

The sensor system 10, shown in FIG. 1 for sensing the temperature in an environment, is based on the temperature dependence of the luminescent decay time of a phosphor material. Short pulses of light from a source 12 are carried on a fiber cable 14 to a connector 16. A bifurcated fiber bundle 18, see FIG. 2, connected to the connector 16 has a first array 20 made up of a series of individual fibers 22, 22'... $22^n$ for communicating the array 24 made of a series of individual fibers 26, 26'... $26^n$ for communicating an output signal from the probe 28 to the connector 16.

Figure 3:
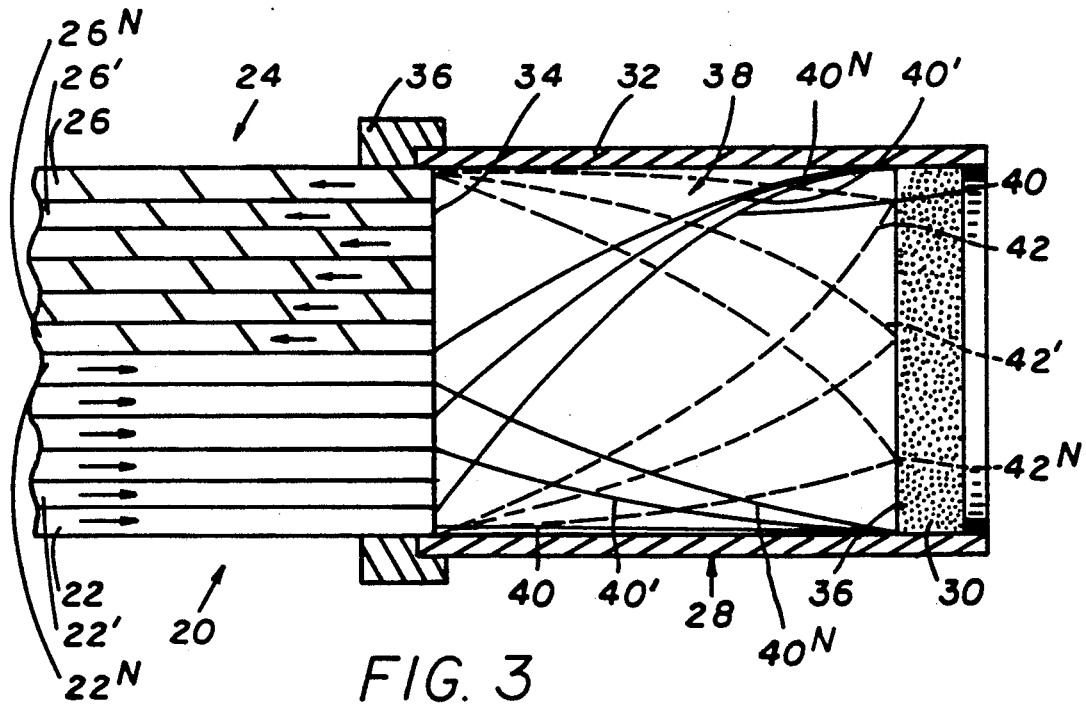
FIG. 3 is a sectional view illustrating a lens system for communication a light beam carried on a first array of a fiber optic bundle to a phosphor material and for focusing a fluorescent output of the phosphor material to a second array of the fiber optic bundle for transmission to a photodetector.

The probe 28, as best shown in FIG. 3, has a housing 32 for positioning a tip in an environment whose temperature is to be monitored. Tip 30 which is made of a chromium doped yttrium oxide known as Alexandrite although it is felt that any phosphor material such as europium doped yttrium would also respond in a satisfactory manner to pulse of light from source 12 produce an output signal corresponding to the temperature of the environment. Tip 30 is located in a housing 32 a fixed distance from the end 34 of the bifurcated fiber bundle 28. End cap 36 attached to housing 32 acts on the fiber bundle 28 to hold the end 34 adjacent a lens arrangement 38.

The lens arrangement 38 is a graded index lens having a first function of collimating the light from the laser 12 that is carried on the first array 20 onto the surface 36 of the phosphor or fluorescent material of the tip 30 and a second function of collimating the glow or fluorescent output of the fluorescent material onto the second array 24. The light carried in each individual fiber 22, 22'... $22^n$ exits therefrom in the shape of a cone. The lens arrangement 38 focuses the individual cones into a collimated beam to uniformly illuminate the surface 36. The light from source 12 carried in fiber 22 is illustrated in FIG. 3 where the cone shaped beam is changed into a collimated beam 40 by lens arrangement 38 while light carried by fiber $22^n$ is changed into a collimated beam $40^n$. The collimated beams 40, 40'... $40^n$ are combined at the surface 36 to provide the phosphor material with an excitation signal to correspondingly develop a glow or fluorescent output signal through the activation of the atoms or molecules in the phosphor material 30. Activation of the atoms or molecules in the phosphor material 30 functions as a point source of light 42, 42'... $42^n$. The lens arrangement 38 collimates the point source of light 42, 42'... $42^n$ back onto end 34 to completely illuminate the entire fiber bundle array 18 where the second array 24 carries the fluorescent signal to connector 16 for communication to detector 44. The fluorescent signal is evaluated in processor 46 and the resulting temperature corresponding to the luminescent decay time supplied to an operator on display 48.

The lens arrangement 38 which collimates the light from the first array 20 to illuminate the entire surface 36 and collimates the fluorescent activity or glass created by the illumination back onto the entire bundle of individual fibers in the second array 24 assures the optimum utilization of the sensor system 10 in evaluation of the temperature in the hostile environment where the probe 28 is located.

I claim:

1. In an optic sensor having a bifurcated fiber bundle with a first array of fibers for communicating pulsed light form a source to illuminate a surface of a fluorescent material, said fluorescent material responding to said pulsed light by glowing to produce an output signal, said bifurcated fiber bundle having a second array of fibers for transmitting the output to a detector, the improvement comprising:

lens means for collimating pulsed light from said first array from a cone into a collimated beam to uniformly illuminate the entire surface of said fluorescent material to produce said glowing as function of the pulsed light carried by said first array and for uniformly collimating said glowing onto the second array to transmit up to one half of the total glow produced by the fluorescent material to said detector.

2. In the optic sensor as recited in claim 1 wherein the glowing of the fluorescent material functions as a multitude of point sources of output light, said point sources of output light being collimated by said lens arrangement to uniformly illuminate said first and second arrays to assure that up to half of the output light produced by said fluorescent material is transmitted to said detector.

3. In the optic sensor as in claim 1 wherein said glow of the fluorescent material varies as a function of temperature.

* * * * *